United States Patent [19]
Otto

[11] Patent Number: 5,781,251
[45] Date of Patent: Jul. 14, 1998

[54] METHOD AND APPARATUS FOR OPTICAL SCANNING FOR SINGLE PANEL COLOR PROJECTION VIDEO DISPLAY

[75] Inventor: Detlev Otto, Spokane County, Wash.

[73] Assignee: U.S. Philips Corporation, New York, N.Y.

[21] Appl. No.: 579,704

[22] Filed: Dec. 28, 1995

[51] Int. Cl.⁶ ............................................. H04N 9/31
[52] U.S. Cl. .................... 348/744; 348/759; 348/760; 359/515
[58] Field of Search .................... 348/744, 752, 348/755, 756, 771, 759, 760–764, 751, 792, 770, 781; 353/81, 122; 359/209, 210, 211, 615, 515; 349/5; H04N 9/31

[56] References Cited

U.S. PATENT DOCUMENTS

| | | | |
|---|---|---|---|
| 3,655,986 | 4/1972 | Lax | 348/744 |
| 4,671,634 | 6/1987 | Kizaki et al. | 353/122 |
| 4,864,390 | 9/1989 | McKechnie et al. | 348/756 |
| 5,023,725 | 6/1991 | McCutchen | 348/744 |
| 5,398,082 | 3/1995 | Henderson et al. | 348/781 |
| 5,450,219 | 9/1995 | Gold et al. | 349/5 |
| 5,532,763 | 7/1996 | Janssen et al. | 348/744 |
| 5,548,347 | 8/1996 | Melnik et al. | 348/761 |
| 5,608,467 | 3/1997 | Janssen et al. | 348/744 |

FOREIGN PATENT DOCUMENTS 0 729 279 A   8/1996   France ................... H04N 9/31

Primary Examiner—Tommy P. Chin
Assistant Examiner—Y. Lee

[57] ABSTRACT

A method and apparatus for a single panel projector, for projecting images having a plurality of color components, include a mechanism for deflecting light into a plurality of directions, and a light panel for receiving the light deflected by the deflecting mechanism. The deflecting mechanism includes a transparent optical medium having a nonuniform thickness, in which light beams enter through a center opening of the medium and exit at areas along a side of the medium.

19 Claims, 5 Drawing Sheets

METHOD AND APPARATUS FOR OPTICAL SCANNING FOR SINGLE PANEL COLOR PROJECTION VIDEO DISPLAY

BACKGROUND OF THE INVENTION

1. Field of the Invention

The present invention generally relates to an optical scanning method and apparatus, and more particularly to a method and apparatus for sequential scanning of a plurality (e.g., three) of color bars across the surface of a single light panel (valve).

2. Description of the Related Art

With a typical color projection display television receiver, three separate cathode ray tubes (CRT) are utilized which have respective red, green and blue phosphors, for projecting respective red, green and blue television pictures. These three CRT pictures are projected onto a single display screen by projection lenses. The red, green and blue television pictures are thereby superimposed on the screen to form a single projected color television picture.

In another conventional color projection display system termed a "three-valve light panel color projection display", three light valves are used instead of the three CRTs. White light is split into three beams carrying one of the three primary colors (Red, Green and Blue), each of which is then modulated by one of three light valves, before the three beams are re-combined into a single projected image. The light valve panels are typically thin-film transistor (TFT) array liquid crystal display (LCD) panels. However, the three-valve light panel is expensive, and has a complicated optical path.

In a third conventional system, as described, for example, in copending U.S. patent application Ser. No. 08/386,606, assigned to the assignee of the present invention and incorporated herein by reference, a single light valve panel has been developed which employs a rotating prism for scanning the red, green and blue bands of light.

In the conventional projection systems, the rotating prism is used to achieve a deflection of three light rays from their original axis for scanning the above-mentioned light rays across the light valve device, the pixel elements of which are programmed with the proper video information (red, green or blue) for the passing light ray of the respective color. The human eye integrates this "color sequential" display of three separate images into a "single" image.

However, the above-described conventional prism approach suffers from two major drawbacks. First, the scanning motion of the output rays is nonlinear, while the light valve requires constant speed of the scanning light band. Because of this incongruity, less than the full scanning range is employed, resulting in a large overscan and therefore loss of light. Thus, the system's efficiency is degraded and it is difficult to obtain a linear scanning.

Secondly, the glass used for the prism has a relatively high refractive index which increases cost for the material.

SUMMARY OF THE INVENTION

It is therefore an object of the present invention to provide a method and apparatus for overcoming the above problems of the conventional projection systems and methods.

Another object of the invention is to provide a method and apparatus for a single panel projection device which does not employ a rotating prism for deflecting a plurality (e.g., three) of light rays from their original axis for scanning the light rays across a light valve device.

Yet another object is to provide a method and apparatus which prevents a large overscan and light loss.

A further object is to provide a system which is relatively low cost.

In a first aspect of the invention, a scanning method and apparatus are provided for use in a single panel projector, for projecting images having a plurality of color components, which includes a mechanism for deflecting light into a plurality of directions, and a light panel for receiving the light deflected by the deflecting mechanism. The deflecting mechanism includes a transparent optical medium having a nonuniform thickness, in which light beams enter through a center opening of the medium and exit at areas along a side of the medium.

Thus, with the structure and method of the present invention, instead of using the conventional rotating prism, the present invention uses a transparent optical medium having a changing thickness in which the beams enter through the center opening of the medium and exit at various points along the side of the medium. The medium may advantageously have a cylindrical, egg- or spiral shape, but may have any shape suitable to meet the designer's needs.

As a result, a large overscan and light loss are prevented. Further, the system is relatively inexpensive to manufacture as opposed to the conventional prism-based deflection systems.

Another advantage is that the material for the transparent optical medium need not be glass, but can be commonly available plastic or the like, and there is a high degree of freedom in designing the transparent optical medium to increase the scanning area.

Further, the optical medium may be easily and advantageously shaped to match the optical system and can compensate for other nonlinearities in the system's optical path.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF THE PREFERRED EMBODIMENT OF THE INVENTION

Figure 1:
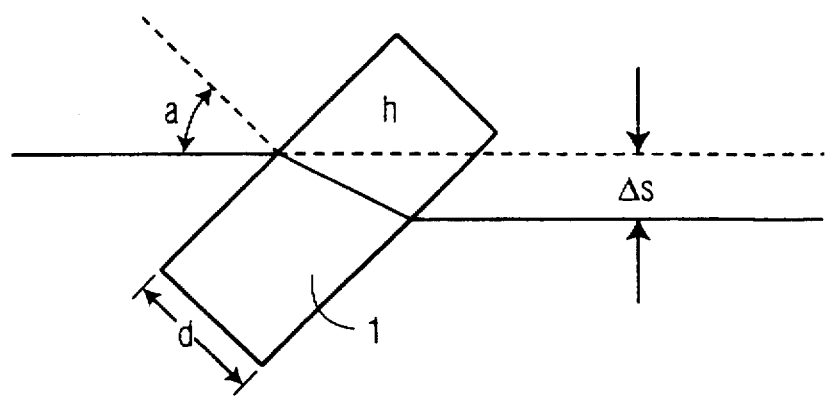
FIG. 1 illustrates a basic principle of the present invention, and more specifically illustrates an optical medium 1 through which a light ray passes.

Referring now to the drawings, and more particularly to FIG. 1, the physical principle upon which the present invention is based, is illustrated.

As mentioned above, in a typical single panel light valve projection system, a rotating prism is typically used. While the scanning method relates to the conventionally used rotating prism in the single panel projector, the present invention uses, instead of a rotating prism, a transparent optical medium which has a changing thickness in which the beams enter through the center opening of the cylindrical medium and exit at various points along the side of the medium. The medium advantageously has a cylindrical-, egg- or spiral-shape.

FIG. 1 depicts the basic principle of the invention. Specifically, the invention is based on the knowledge that a light ray passing through an optical medium 1 (e.g., formed of glass or the like) with two parallel transition surfaces does not change its direction. Instead, the light ray exits the medium 1 at a parallel offset s which is a function of the thickness d of the material its refractive index n and the entrance angle a. Specifically, the changing value of s is equal to $$\Delta s = d \cdot \sin(\alpha) \left[ 1 - \cos(\alpha) \left( 1/(\sqrt{(n^2 - \sin^2(\alpha))}) \right) \right] \quad (1)$$

Figure 2A:
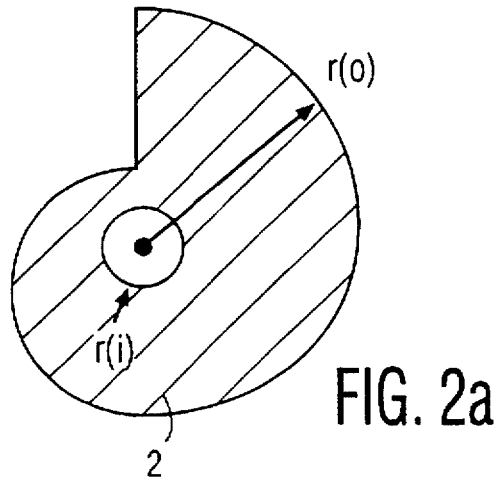
FIG. 2 illustrates a cross-section and a side view of a deflector 2 according to the present invention.
Figure 2B:
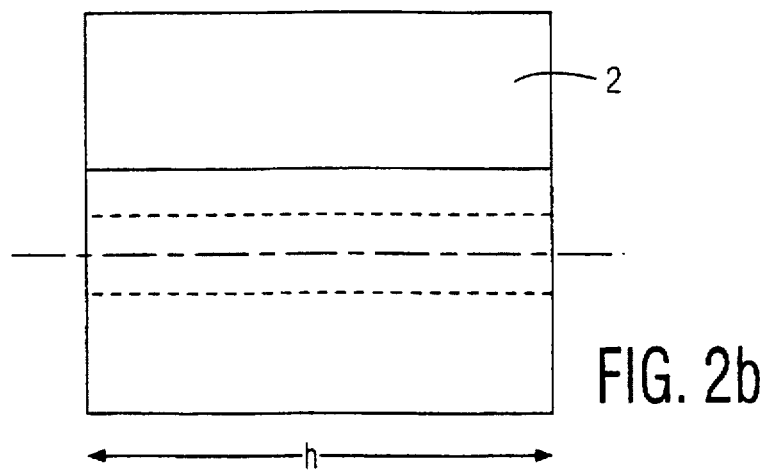

The above equation makes clear that the change in s is directly proportional to d. Thus, a method of achieving a varying s is to change the thickness d in a controlled fashion. One suitable arrangement is to use a body made of, for example, glass (hereafter referred to as a "deflector") with the following characteristics (see also FIG. 2, described below, for linear deflection). In lieu of glass, commonly-available transparent plastic may also be employed.

Turning now to the details of the inventive structure and method, FIGS. 2–4c are diagram of a scanning mechanism 2 (e.g., a deflector 2) for use, for example, in a projection television system. The scanning mechanism is for deflecting one or more light beam(s) parallel to its/their respective axes such that the light beam scans (e.g., "moves across"), for example, a light valve. The resulting scanning motion can be either linear or non-linear.

First, the cross-section of the deflector 2 is preferably cylindrical, egg- or spiral-shaped with a circular cut-out at the center, the dimensions being defined as r(o) and r(i), respectively. The height h is not critical so long as the basic function of the deflector is not impaired. Thus, the scanning mechanism is scalable according to the designer's constraints and requirements. r(i) is a constant, while r(o) is a function of the rotation angle. The mathematical function describing r(o) can be linear, non-linear, periodic, monotonous, discontinuous, etc.

The refractive index of the deflector material may be any value greater than 1.0, even though a higher number will result in smaller overall dimensions and thus may be more preferable. The deflector may have any thickness depending on the designer's requirements and constraints. However, there is generally a trade-off between the overall system's optical path, the overall dimensions and that the light throughput will be higher the smaller the refractive index is.

Figure 3:
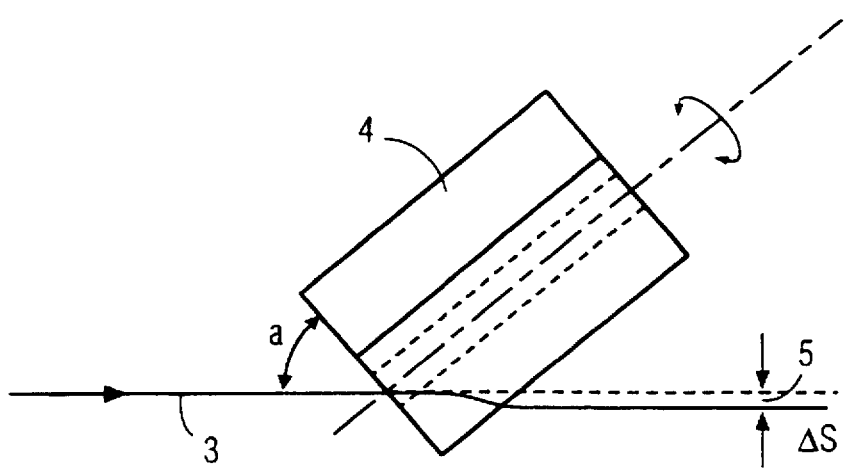
FIG. 3 illustrates a ray entering a body through the center opening at a predetermined angle α.

As shown in FIG. 3, a light ray 3 entering the body 4 through the center opening at an angle α is subjected to a deflection 5. The amount of deflection 5 depends on the effective thickness of the deflector which in turn is defined by its rotation angle.

Maintaining the ray 3 in a fixed position and rotating the deflector causes a periodic deflection of the ray. If r(o) is chosen to be directly proportional to the rotation angle, a linear scanning pattern results, thereby overcoming the shortcomings of the conventional prism approach. However, the principle of the invention is not limited to such a narrow function, and numerous modifications and extensions can be envisioned.

Figure 4A:
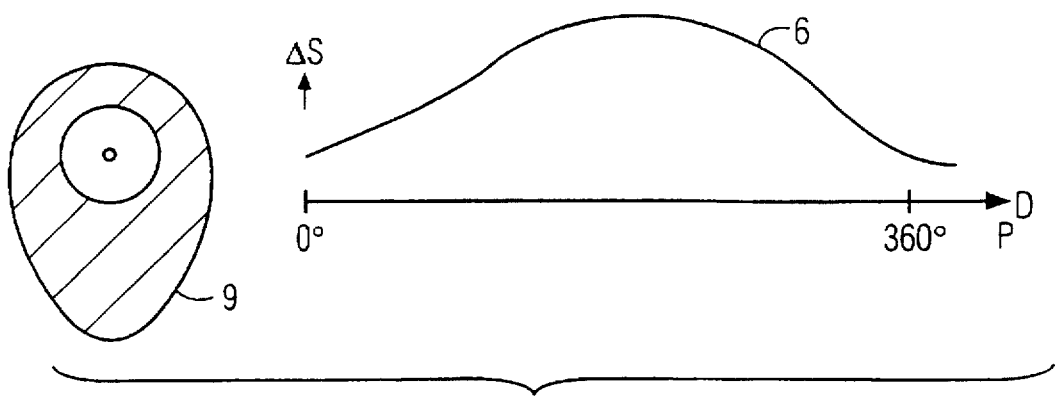
FIGS. 4a, 4b, and 4c illustrate respective scanning patterns 6, 7, and 8, and the cross-sections of deflectors 9, 10, and 11, respectively.
Figure 4B:
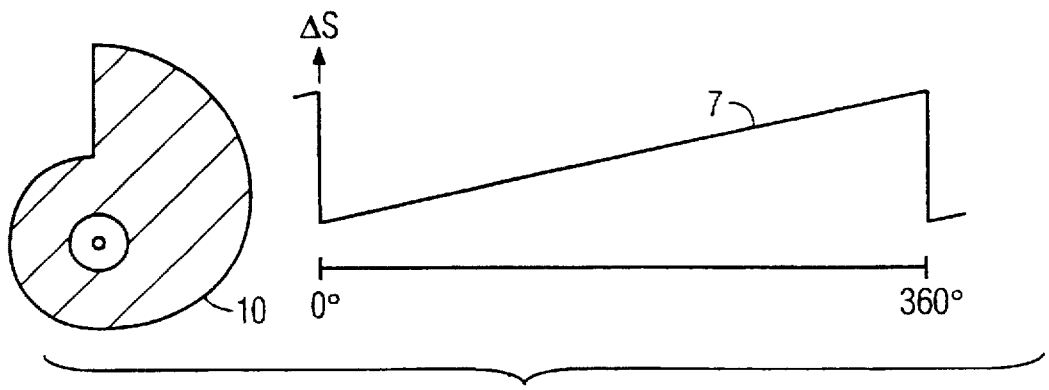
Figure 4C:
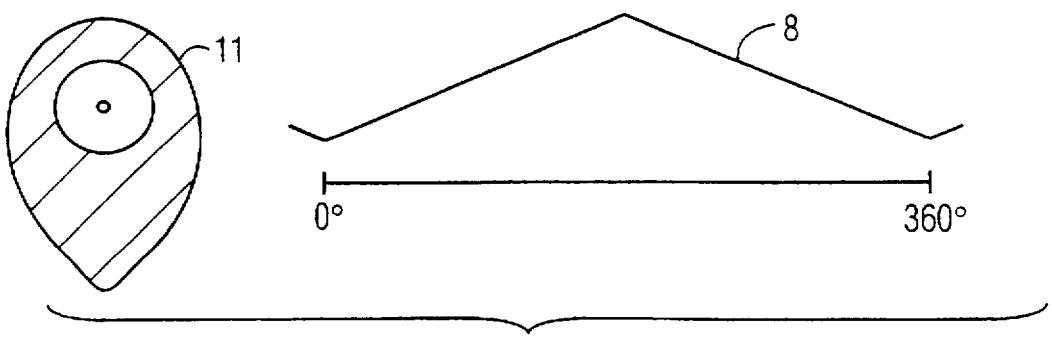

For example, FIGS. 4a–4c respectively illustrate examples of the scanning patterns 6, 7, and 8 and the respective cross-sections 9, 10, and 11 of deflectors according to the present invention. The design of the outer and inner radius given a large degree of freedom in adapting the scanning motion to the light valve's optical path and the overall system. Thus, changes in the system may be easily compensated for.

In the above-mentioned projection system, three light rays (e.g., red, green and blue (R,G,B)), as opposed to simply one light ray, are to be deflected. One approach would be to use three deflectors, synchronized by, for example, known mechanical means such as a gearbox.

Figure 5A:
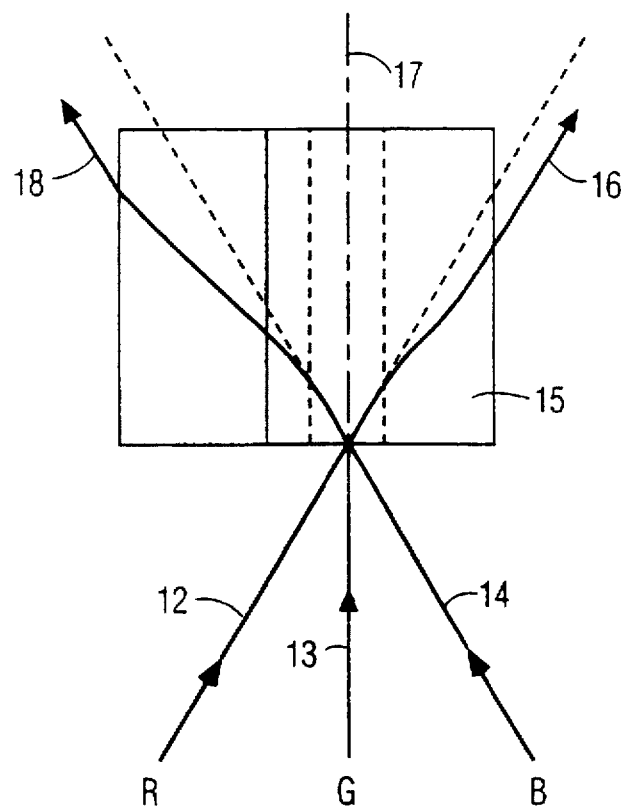
FIGS. 5A and 5B illustrate a side view and a cross-section, respectively, of a deflector 15 and illustrates the deflection of three light beams according to the present invention and more specifically illustrate the relationship of the change in the outer radius of the deflector to the amount of deflection of the three light beams.
Figure 5B:
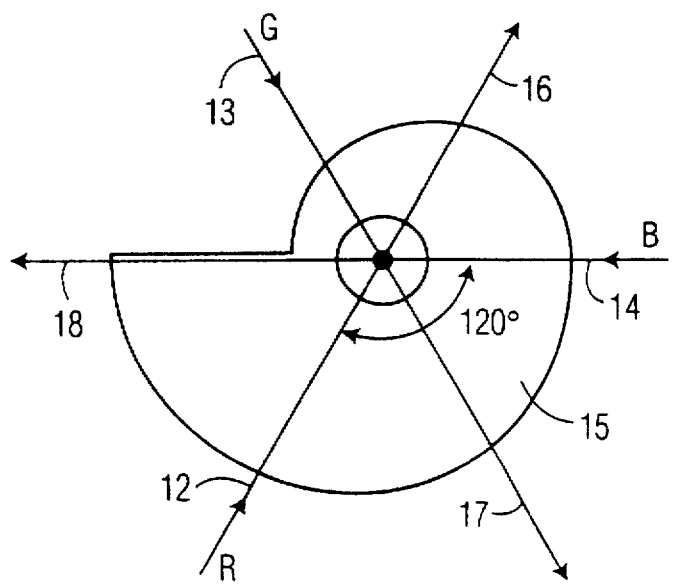

However, a more compact approach would be to utilize only a single deflector 15, as shown in FIGS. 5a and 5b. As shown in FIGS. 5a and 5b, three light rays 12, 13, and 14 representing red, green and blue, respectively, enter the core of the deflector 15 from different sides so that each color has its own respective rotation angle. Each of the rays has a different offset from its respective incoming beam angle. Thus, for example, in FIGS. 5a and 5b, it is shown that light beam 14 (e.g., Blue) is deflected the most, followed by beam 12 (e.g., Red), and finally beam 13 (e.g., Green) which requires the least amount of deflection.

The diverging exit rays 16, 17, and 18, respectively, have to be collimated with a suitable mirror arrangement (e.g., mirrors 27, 29) and a recombination optical system 30.

The recombination optical system 30 includes, for example, intertwined dichroic mirrors (e.g., a so-called "3D dichroic combiner").

Figure 6:
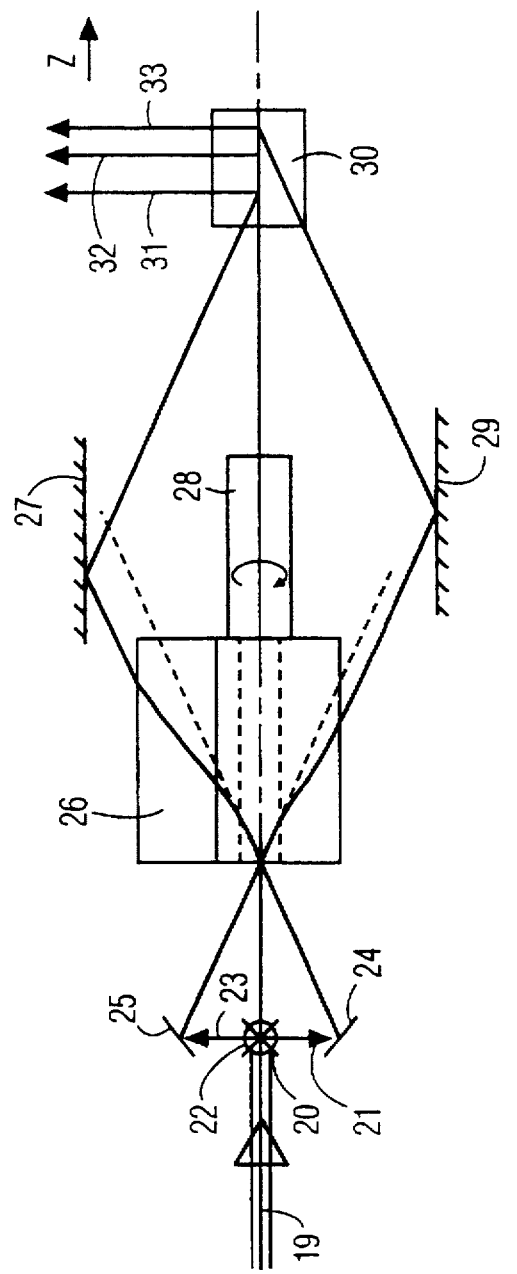
FIG. 6 is a schematic diagram of a light path arrangement utilizing a deflector according to the present invention.

FIG. 6 illustrates a light path arrangement utilizing the inventive arrangement of FIGS. 5a and 5b.

Specifically, white light 19 is applied to a three-dimensional dichroic splitter 20 including a plurality of dichroic mirrors (or filters) which cause the red 21, green 22 and blue 23 portions of the incoming light to exit the splitter perpendicular to the axis of the incoming ray and having a predetermined angle (e.g., an angle of 120 degrees) between each other.

Each ray is reflected by one of three dichroic mirrors. For brevity and clarity, FIG. 6 simply illustrates two mirrors 24, 25 of the three mirrors. The third mirror (e.g., not shown) is positioned behind the splitter 20 relative to the reader's direction. Each ray enters the deflector 26 core at the same angle relative to the rotation axis. The rays exiting the deflector 26 undergo a deflection different for each of the three rays because each of the rays goes through a different thickness of the optical medium 26. Thus, the thickness of the optical medium results in a different deflection for each of the rays.

Mirrors 27, 28, and 29 redirect the beams towards the three-dimensional dichroic combiner 30. Three separate rays 31, 32, and 33 exit the setup perpendicular to the axis of the incoming ray 19. The rotation of the deflector 26 causes the z position of the respective rays to change according to the desired scanning motion. It is noted that specialized coatings could be used for the mirrors such as infrared (IR) or ultraviolet (UV) coatings for respectively filtering out IR and UV rays.

The above structure is advantageous in that the structure is relatively easy to construct and that the problems of the conventional rotating prism design are overcome.

Thus, with the structure and method of the present invention, a rotating prism for deflecting the three light rays from their original axis with the purpose of scanning the light rays across a light valve device, is not used. The inventive method and apparatus prevent a large overscan and light loss. Further, a system is provided which is relatively low cost.

Hence, instead of using the conventional rotating prism, the present invention uses a transparent optical medium having a changing thickness in which the beams enter through a center opening of the medium and exit at various points along a side of the medium.

Further, a simpler optical path and a less complicated arrangement of components result with the structure of the present invention.

While the invention has been described in terms of a single preferred embodiment, those skilled in the art will recognize that the invention can be practiced with modification within the spirit and scope of the appended claims.

For example, while the drawings show the optical medium as having a cylindrical, egg- or a spiral shape, other shapes such as a polygonal shape, would also be advantageous depending upon the system configuration, system performance requirements and dimensional constraints.

Having thus described my invention, what I claim as new and desire to secure by Letters Patent is as follows:

1. A single panel projector system, for projecting images having a plurality of color components, comprising:

a deflector for deflecting light into a plurality of directions; and a light panel for receiving said light-deflected by said deflector, said deflector comprising a cylindrical transparent optical medium having an axis, a central opening along said axis, a curved exterior surface and a cross-sectional thickness extending from said axis to said exterior surface, such that said cross-sectional thickness comprises a nonuniform thickness, wherein beams of said light enter through said center opening of said medium and exit at areas along said exterior surface of said medium.

2. A projector system according to claim 1, wherein said medium comprises one of an egg-shaped medium and a spiral-shaped medium.

3. A projector system according to claim 1, wherein said deflector deflects at least one light beam of said beams parallel to a respective light beam axis such that the light beam moves across said light panel, and wherein a scanning motion is one of linear and non-linear.

4. A projector system according to claim 1, wherein said deflector comprises one of transparent plastic and glass.

5. A projector system according to claim 1, wherein said deflector includes a cross-section having one of a spiral-shape and an egg-shape, said central opening having a constant radius from said axis r(i), said cross-sectional thickness comprising a variable radius from said axis r(o), wherein said variable radius r(o) comprises a function of a rotation angle of said deflector around said axis.

6. A projector system according to claim 5, wherein said variable radius r(o) is directly proportional to the rotation angle, such that a linear scanning pattern results.

7. A projector system according to claim 1, wherein said deflector has a cross-sectional shape comprising a spiral.

8. A projector system according to claim 1, wherein said deflector has a cross-sectional shape comprising a half-spiral.

9. A projector system according to claim 1, wherein a plurality of light rays are deflected simultaneously by said deflector.

10. A projector system according to claim 1, wherein a single deflector is provided for deflecting said beams simultaneously, and wherein each beam of said beams has a respective rotation angle.

11. A projector system according to claim 1, further including a collimator for collimating diverging exit rays and a recombination optical system, said recombination optical system including intertwined dichroic mirrors.

12. A method for projecting images having a plurality of color components and for use with a single panel projector system, said method comprising steps of:

providing said single panel projector system with a cylindrical transparent optical medium having an axis, a curved exterior surface and a cross-sectional thickness extending from said axis to said exterior surface, such that said cross-sectional thickness comprises a nonuniform thickness;

deflecting, by said transparent optical medium, light into a plurality of directions; and receiving, by a light panel of said single panel projector system, said light having been deflected, wherein beams of said light enter through a center opening of said medium positioned along said axis and exit at areas along said exterior surface of said medium.

13. A method according to claim 12, wherein said step of providing a transparent optical medium comprises a step of providing one of an egg-shaped medium and a spiral-shaped medium.

14. A method according to claim 12, wherein said step of deflecting includes a step of deflecting at least one light beam of said beams parallel to a respective light beam axis such that the light beam moves across said light panel, and wherein a scanning motion is one of linear or non-linear.

15. A method according to claim 12, wherein said step of providing a transparent optical medium comprises a step of providing one of transparent plastic and glass.

16. A method according to claim 12, wherein said step of providing a transparent optical medium comprises a step of providing a transparent optical medium including a cross-section which has one of a spiral-shape and an egg-shape, said center opening having a constant radius from said axis r(i), said cross-sectional thickness comprising a variable radius from said axis r(o), wherein said variable radius r(o) comprises a function of a rotation angle of said deflector around said axis.

17. A method according to claim 16, wherein said variable radius r(o) is directly proportional to the rotation angle, such that a linear scanning pattern results.

18. A method according to claim 12, wherein said step of deflecting comprises a step of deflecting simultaneously a plurality of said beams by said transparent optical medium.

19. A method according to claim 12, wherein said step of deflecting comprises a step of deflecting simultaneously a plurality of said beams by a single one of said transparent optical medium, and wherein each beam of said plurality of beams has a respective rotation angle, said method further including a step of collimating diverging exit beams.

* * * * *